May 17, 1966   J. G. FRANCIS   3,251,241
RESILIENT HANDLE-BAR GRIP
Filed June 28, 1965

Inventor
James G. Francis
by Rines and Rines
Attorneys

United States Patent Office 3,251,241
Patented May 17, 1966

3,251,241
RESILIENT HANDLE-BAR GRIP
James G. Francis, Hialeah, Fla., assignor to Royalty Designs of Florida, Inc., Hialeah, Fla., a corporation of Florida
Filed June 28, 1965, Ser. No. 467,414
4 Claims. (Cl. 74—551.9)

The present invention relates to resilient handle-bar grips and, more particularly, to resilient tubular plastic grips, as of rubber or other plastic materials, including polyvinyl chloride polymers and copolymers and other organic polymer plastics conventionally applied to bicycle handle bars and other similar handles.

For many years, such handle bars have been provided with such sheath-like resilient cover grips for the purpose of enabling the user to maintain a firm hold upon the handle. Such grip devices, however, have been consistently subject to at least two previously inherent disadvantageous problems in usage; first, difficulty in application of the resilient tubular handle grip to the handle bar of just smaller or comparable cross-dimension; and, secondly, the accidental loosening and commencement of dislodging of the grip caused by transverse compression of the terminal portions thereof in use.

It is an object of the present invention, accordingly, to obviate these disadvantages in a simple and yet highly practical manner, providing a new and improved hollow resilient plastic handle-bar grip that may readily be applied and that will resist inadvertent commencement of loosening or removal caused by transverse compression applied in use.

A further object is to provide a new and improved plastic handle-bar grip of general utility that may be fabricated from any desired plastic, including the above-mentioned types, among others.

Other and further objects will be explained hereinafter, being more particularly pointed out in connection with the appended claims. In summary, however, the resilient hollow plastic handle-bar grip of the present invention contemplates a resilient longitudinally extending cylindrical portion for receiving and gripping a longitudinal handle bar, the grip terminating beyond juxtaposed ends of the handle bar and cylindrical grip portion covering the same in a rearwardly extending hollow resilient irregular-surface bulbous end portion having a plurality of outwardly extending resilient pockets disposed such that transverse resilient compression of the end portion produces an irregular collapsed pressure-locking effect at spaced regions of the periphery of the said juxtaposed ends of the said handle bar and cylindrical grip portion covering the same, preventing loosening of the said grip from the handle bar through the suction and friction effects of said collapsed pressure locking; the said pockets being disposed at intermediate regions of the bulbous end portion between its region of connection to the said cylindrical grip portion and its rear wall, the cross-dimension of the hollow bulbous end portion near its said rear wall being reduced to provide a resilient terminal chamber deformable in response to said transverse resilient compression to aid in effecting said collapsed pressure locking, the bulbous end portion of the grip being also compressible longitudinally in the direction along the longitudinal axis of the cylindrical grip portion to stretch open the inner wall of the cylindrical grip portion about its periphery near its said end to assist in the facile longitudinal movement of the grip over the handle bar.

The invention will now be described in connection with the accompanying drawing, FIG. 1 of which is an isometric view illustrating a hollow resilient handle bar grip constructed in accordance with a preferred embodiment;

Figure 1:
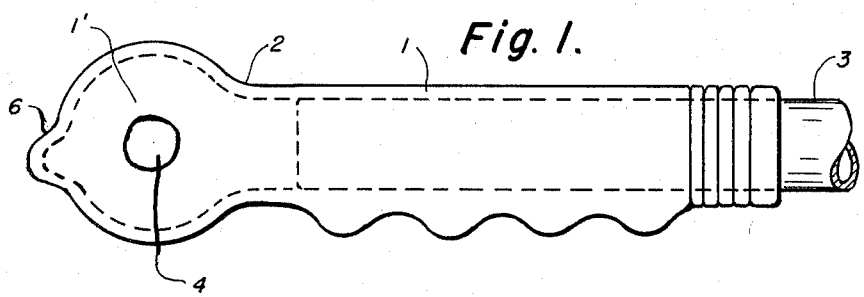

Referring to the drawing, the resilient plastic handle-bar grip of the present invention is shown comprising a hollow longitudinally extending cylindrical portion 1 terminating in a hollow resilient irregular-surface bulbous end portion 1' that, unlike prior-art handle-bar grips, defines a hollow of substantial volume rearward of the juxtaposed ends of the handle bar 3 and the cylindrical grip portion 1 covering the same. In acordance with the invention, use is made of this substantial rearward volume in cooperation with particular critical constructional features of the bulbous end portion 1', later explained, to attain highly novel results. In prior-art devices of this character, no such substantial rearward volume and constructional end portion features have been provided, though some grips have terminated in relatively small and stiff cap portions mainly for the purpose of providing a stop for preventing the rearward slipping-off of a hand gripping the handle-bar grip. This rigid stop function, however, is decidedly to be distinguished from the deliberate provision of a highly resilient compressible substantial hollow end portion volume at 1'.

Figure 3:
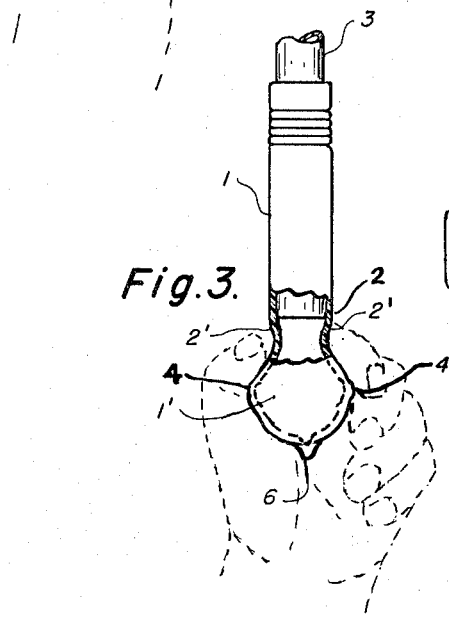
FIG. 3 is a similar view illustrating the collapsed pressure-locking action effected in accordance with the present invention upon transverse compression of the end portion of the grip.

By employing a plurality of outwardly extending projections or pockets 4, irregularly disposed about the circumferential periphery of the resilient end portions 1', an unsymmetrical compression locking effect takes place, more particularly shown in FIG. 3, upon inadvertent or purposeful transverse compression, in use, of the end portion 1' of the grip, resisting any tendency to loosen or remove the grip from the handle bar 3. It has been found that if the outward projections 4 are located at regions intermediate the region 2 of connection of the bulbous end portion 1' to the cylindrical grip portion 1 and the rear wall 6 thereof, and if the cross-dimension of the end portion 1' near said rear wall 6 is reduced to provide a hollow resilient terminal expansion-like chamber, suction and friction effects are produced upon transverse compression of the end portion 1' that are highly beneficial. Specifically, since this construction enables the end portion 1', upon transverse compression in the external pocket region 4, FIG. 3, to deform both forward and rearward, a collapsed pressure-locking effect occurs in practice at spaced oppositely disposed peripheral regions 2' of the cylindrical portion 1 over the end of the handle bar 3. This has been found to produce a high pressure locking force effectively resisting any accidental tendency for loosening the grip upon squeezing the same in use. Preferably, at least portions of the wall thickness of the resilient plastic of the end portion 1' are made thinner than the wall of the cylindrical portion 1 to provide greater resiliency, as later discussed.

Figure 2:
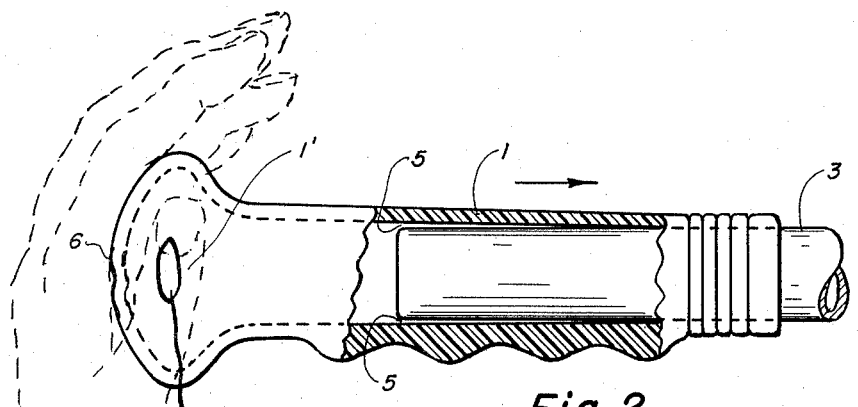
FIG. 2 is a similar view illustrating the longitudinal compression of the bulbous terminal end portion of the grip for enabling the insertion or removal of the grip over the handle bar.

Through this construction, moreover, a differential stress effect of an entirely different nature is produced if the bulbous end portion 1' is subjected to horizontal compression along the direction of the longitudinal axis of the cylindrical portion 1, as shown in FIG. 2. When the rear wall 6, for example, is longitudinally collapsed or depressed inward, the particular constructional features of the end portion 1', previously described, have been found to cause an effective stretching-open of the inner wall of the cylindrical grip portion 1, somewhat uniformly about its periphery, near the end of the handle bar 3, as more particularly shown at 5 in FIG. 2. This results in facile longitudinal movement of the grip 1 over the handle bar 3 for covering or withdrawal purposes.

An additional beneficial result that occurs in a substantially closed system having handle-bar grips sealing off both ends of a bicycle handle bar, for example, resides in the fact that resilient compression of the end portion 1', particularly in the longitudinal direction of FIG. 2, but to some extent during transverse compression, as shown in FIG. 3, forces air trapped within this closed system out between the inner wall of the cylindrical portion 1 of the resilient grip and the handle bar 3, establishing somewhat of a vacuum that, after several compressional squeezing operations serves to lock the elastic cylindrical portion 1 of the grip tightly to the metal surface of the handle bar 3.

Figure 4:
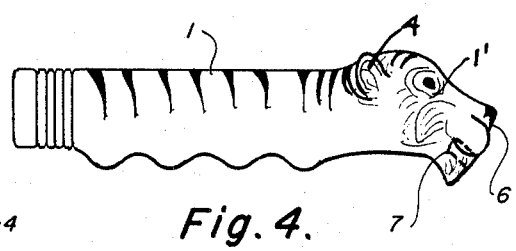
FIG. 4 is a view similar to FIG. 1 of a modification illustrating simultaneous usage of the bulbous end portion of the grip as a source of compressed air for operating a whistle, horn or similar type of device.

By use of the novel grip construction of the invention, therefore, transverse compression of the bulbous end portion 1' of the handle grip, as in use, results in a collapsed pressure-locking action, FIG. 3, that resists longitudinal slipping movement of the grip, whereas longitudinally directed compression of the end portion 1', FIG. 2, adapts the handle grip for ready movement in the longitudinal direction, as for the purpose of inserting over the handle bar or removing the grip therefrom. This operation represents a decided advance over prior-art devices in which the problem of inadvertent slipping of the grip during use is not solved, and in which the problem of applying the tightly fitting handle-bar grips is generally approached by placing an undesirable sizable hole in the terminal portion of the grip, by providing the grip with special ancillary intermediately formed rib structures for aiding in opening the inner diameter of the grip, or just by physically exerting great effort to force-rotate the grip onto the handle bar. Such prior-art devices, moreover, void of the large-volume bulbous resilient end portion 1' with the terminal chamber abutting the rear wall 6, cannot be used for additionally advantageous purposes such as the insertion of a horn device or whistle, as more particularly shown at 7 in the embodiment of FIG. 4, for simultaneous sound-producing usage of the end portion 1'. It should be apparent, moreover, that the provision of the reduced-dimension chamber near the rear wall 6, in addition to its before-mentioned functions, serves the additional purpose of rendering the bulbous end portion 1' more readily transversely resiliently compressible by the user. This is particularly important where it is desired to make use of the volume within 1' as a source of air for operating a whistle or other sound-device 7, as shown in FIG. 4.

It is, moreover, fortuitous that the end-portion construction that performs the previously described novel selective functions of enabling ready longitudinal movement upon longitudinal compression, but resisting longitudinal slipping when transverse compression is applied, lends itself particularly for the artistic decorating of the terminal portion of the handle-bar grip with, for example, an animal or human head-like decoration. Since the ear regions of heads, for example, extend outwardly, they or similar projections are readily adaptable to be formed into the functional pockets 4; whereas the mouth and nose regions lend themselves to coincide with the functional requirement of a rearward reduced cross-section terminal chamber at 6, if so formed, as more particularly shown in FIG. 4.

As an illustration of the effectiveness of the construction of the present invention, tests have been performed comparing the same with similar-dimensioned grips of the same plastic material (rubber or plasticized polyvinyl copolymers), constructed in accordance with the previously described prior-art constructions. A preferred cylindrical portion wall thickness of about 3/16 of an inch and a length of approximately 5 inches was employed. In the grips having the form shown in the drawings, the terminal portion 1' was at least substantially one third of the length of the cylindrical portion 1; in this particular case, about two inches long, with outwardly extending pockets 4 providing a maximum end-portion cross-dimension of from one and one-half to two and one-half times the outer diameter of the cylindrical portion 1, in order to define a sufficient hollow volume rearward of the cylindrical portion 1 to perform the above-described functions. The terminal chamber portion near the rear wall 6 was reduced to a cross-dimension somewhat smaller than the inner diameter of the cylindrical portion 1 for providing the collapsed-distortion of expansion-chamber effects, before discussed, with wall sections of the bulbous end portion 1' somewhat thinner than that of the cylindrical portion 1 to provide for facile transverse and longitudinal compression thereof. As measured on a hardness durometer A scale, the cylindrical portion 1 of the hand grip may have a hardness of the order of 50 (as compared with 75 to 90 on present-day polyvinyl hand grips), with portions of the bulbous end portion 1' having less hardness of as low as 35 to 40, for the purposes above described.

Tests performed with tension-spring measuring apparatus showed that the force required to start to pull such a grip upon the handle bar 3 without the aid of the longitudinal compression of FIG. 2, was of the order of 12 pounds; whereas, upon the longitudinal compression of the end portion 1', as on FIG. 2, less than about one pound of pressure is necessary to start the insertion process in a free and easy manner. Similar measurements in connection with the slipping or removal of the handle-bar grip in response to transverse compression and longitudinal tugging, showed that in the absence of the transverse pressure with the collapsing locking action of FIG. 3, the handle grip could start to be removed by about 6 pounds of longitudinal pressure; whereas with the locking action of FIG. 3, about 12 pounds of longitudinal pull was required before any longitudinal slippage of the handle bar occurred, demonstrating the decided efficacy of the invention, as previously explained.

With a cylindrical grip 1 absent the bulbous head 1' but of the same dimensions, closed over the handle bar 3 in a tight seal, again about 6 pounds of pressure was required to start longitudinal slipping off the handle bar; whereas, with a hole in the rear wall, as in some prior-art commercial units, before described, only about two pounds was required to start such slipping—again, as contrasted with the improved results above given for the present invention.

With an almost substantially spherical cap member 1' void of a reduced terminal expansion chamber near the rear wall 6, compression did not produce the collapsing locking action of FIG. 3 and required only about 6 pounds to start longitudinal slipping.

Further modifications will occur to those skilled in the art and all such are considered to fall within the spirit and scope of the invention as defined in the appended claims.

What is claimed is:

1. A hollow resilient plastic handle-bar grip comprising, in combination, a longitudinally extending cylindrical portion for receiving and gripping a longitudinal handle bar, the grip terminating beyond juxtaposed ends of the handle bar and cylindrical grip portion covering the same in a rearwardly extending hollow resilient irregular-surface bulbous end portion having a plurality of outwardly extending resilient pockets disposed such that transverse resilient compression of the bulbous end portion produces an irregular collapsed pressure-locking effect at spaced regions of the periphery of the said juxtaposed ends of the said handle bar and cylindrical grip portion covering the same, preventing loosening of the said grip from the handle bar through the suction and friction effects caused by said collapsed pressure locking, the said pockets being disposed at intermediate regions of the said bulbous end portion between its region of connection to the said cylindrical grip portion and its rear wall, the cross-dimension of the hollow bulbous end portion near its said rear wall being reduced to provide a resilient terminal chamber deformable in response to said transverse resilient compression to aid in effecting said collapsed pressure locking, the bulbous end portion of the grip being also resiliently compressible longitudinally in the direction along the longitudinal axis of the cylindrical grip portion to stretch open the inner wall of the cylindrical grip portion about its periphery near its said end to assist in the facile longitudinal movement of the grip over the handle bar.

2. Apparatus as claimed in claim 1 and in which portions of the said bulbous end portion are thinner than the thickness of the cylindrical portion to provide for facile resilient compression thereof.

3. Apparatus as claimed in claim 1 and in which the said bulbous end portion is provided near its said rear wall with an opening for receiving a sound-producing device such as a whistle and the like.

4. Apparatus as claimed in claim 1 and in which the said bulbous end portion is decoratively formed in the appearance of a head wherein the ear regions of the head may provide the said outwardly extending pockets and the nose and mouth regions provide the said reduced cross-dimension terminal chamber portion.

References Cited by the Examiner
UNITED STATES PATENTS

| | | | |
|---|---|---|---|
| 445,914 | 2/1891 | Waterson | 74—551.9 |
| 2,094,217 | 9/1937 | Meredith | 74—551.9 |

BROUGHTON G. DURHAM, *Primary Examiner.*

C. F. GREEN, *Assistant Examiner.*